United States Patent [19]

Lane

[11] 4,213,303
[45] Jul. 22, 1980

[54] SUN TRACKING SOLAR ENERGY BOILER

[76] Inventor: William E. Lane, 1200 Central Ave., Wilmette, Ill. 60091

[21] Appl. No.: 898,876

[22] Filed: Apr. 21, 1978

[51] Int. Cl.³ .............................................. F03G 7/02
[52] U.S. Cl. ...................................... 60/641; 126/437; 126/440
[58] Field of Search .................. 60/641; 126/271, 437, 126/440

[56] References Cited

U.S. PATENT DOCUMENTS

| | | | |
|---|---|---|---|
| 1,989,999 | 2/1935 | Niederle | 60/641 |
| 2,205,378 | 6/1940 | Abbot | 126/271 |
| 4,010,614 | 3/1977 | Arthur | 60/641 |
| 4,068,474 | 1/1978 | Dimitroff | 60/641 |

Primary Examiner—Allen M. Ostrager
Attorney, Agent, or Firm—Clarence A. O'Brien; Harvey B. Jacobson

[57] ABSTRACT

A sun tracking solar energy boiler comprising a solar radiation collector and tracking assembly for collecting and focusing solar radiation upon a surface maintained precisely normal to its direction of incidence, in combination with boiler means comprising a preheat tank and steam pressure tank arrangement to maintain a predetermined water level in boiler tubes. The collector and tracking system is provided with means for tracking the sun in its hourly travel from sunrise to sunset, and means is provided for matching seasonal changes of the sun from the summer maximum height to the winter maximum dip with use of a completely automatic apparatus requiring a minimum of manual attention. Means are provided to prevent or remove any lens obscuration, and liquids other than water can be successfully used in the boiler means. Properly adjusted, the system is operable anywhere on earth with a latitude of 5 degrees or higher; special adaptation can be made for locations nearer the equator. The system generates electric power during the period of peak electrical power demand, and is thereby complementary with systems adapted to provide uniform power generation throughout the day and night.

10 Claims, 5 Drawing Figures

4,213,303

SUN TRACKING SOLAR ENERGY BOILER

BACKGROUND OF THE INVENTION

1. Field of the Invention

The invention relates to an improved boiler system utilizing solar radiation as its sole heat source. More particularly, the invention relates to a solar energy boiler having a preheat and steam pressure tank arrangement to maintain a predetermined water level in boiler tubes, in combination with solar energy collection means to maximize solar energy collection by focusing solar radiation and by continually directing the energy collecting surface normal to the direction of incidence of solar radiation throughout the day, with compensation for seasonal variations in the sun's position.

2. Description of the Prior Art

Many devices for collection of solar energy are known. Severy in U.S. Pat. No. 937,013 discloses a lens device associated with a solar tracking boiler to produce steam. The Severy device, however, requires manual adjustment of declination and winding of a coil spring for tracking diurnal solar motion.

Courtis et al in U.S. Pat. No. 2,182,222 show a parabolic reflector focusing solar energy on a boiler. However, a complex control mechanism is required due to a coordinate system not based upon apparent motion through the plane of the ecliptic.

Also showing focusing of solar radiation with a parabolic mirror rotated about its focus is the Ketchum U.S. Pat. No. 784,005, showing a vaporizer, motor, and reservoir or tank receiving heated liquid. Ketchum fails to disclose specifically the mechanism for movement of the mirror, and the apparatus suffers from problems characterizing all parabolic mirror reflectors, namely, reradiation from the absorber back to the enveloping surface of the mirror with consequent loss of collection efficiency. Other problems associated with a parabolic mirror also exist, such as requirement for providing special protection against atmospheric precipitation, objects such as leaves, and the like. Toulmin, in U.S. Pat. No. 3,070,643, also employs a reflector to concentrate solar rays on a point. Toulmin adjusts declination through a feedback mechanism and adjusts to diurnal movement of the sun by a motor.

Also using a parabolic mirror reflector is Bowen in U.S. Pat. No. 2,872,915, who also locates a secondary mirror as a cover over the primary mirror. Barr in U.S. Pat. No. 561,755 focuses sunlight with two mirrors on a boiler. The Brantley et al patent (U.S. Pat. No. 4,011,854) discloses a mount for continuously orienting a parabolic mirror collector dish for seasonal and diurnal solar variation of position. Specifically omitted are details of the absorber, and the patent fails to teach production of energy by a boiler or other means.

The patents above and the other patents listed below are cited to show the state of the prior art:
U.S. Pat. Nos:
  787,145—Apr. 11, 1905—Brown
  1,220,091—Mar. 20, 1917—Goff
  1,993,213—Mar. 5, 1935—Gill
  2,460,482—Feb. 1, 1949—Abbot
  2,687,126—Aug. 24, 1954—Bouchet
  2,920,710—Jan. 12, 1960—Howard
  2,969,637—Jan. 31, 1961—Rowekamp
  3,995,429—Dec. 7, 1976—Peters.
  Re. 25,242—Sept. 11, 1962—Toulmin, Jr.

SUMMARY OF THE INVENTION

The present invention overcomes difficulties associated with prior solar collector devices which rely upon a parabolic mirror to reflect solar radiation toward a focal point, such problems including those associated with reradiation and with protection from intrusion of outside elements, such as precipitation, falling leaves, or the like.

Furthermore, the present invention avoids problems associated with efficiently converting absorbed solar radiation to a useful form of energy by providing a boiler system in combination with the solar collector and a steam engine or turbine for generating useful electric power.

It is accordingly an object of the present invention to provide a device which maximizes collection of solar radiation by continually directing a collection surface normal to the direction of solar radiation and to provide electrical power generation with storage during non-sunlight hours.

Another object of the invention is to maximize solar energy utilization by focusing solar radiation in a collector tube oriented completely automatically to track at a precise and accurate rate the path of the sun.

Still another object of the invention is to provide a source of electrical energy during the period of peak demand to cooperate with electrical power generation systems which provide uniform power generation throughout the day and night, such as hydroelectric sources.

Yet another object of the invention is to provide a solar electric generation system with less complicated piping than prior art devices, and with the capability for using other liquids than water.

Another feature of the invention is operability at any location on earth with latitude 5 degrees or higher, with provision for special adaptation for locations nearer the equator.

Still another feature of the invention is a lens solar collector having means to prevent or remove any obscuration of the lens surface by dew, frost, or air pollutants.

Still another further object of the invention is to provide a preheat and steam pressure tank arrangement to maintain a predetermined water level in boiler tubes in the boiler system for generation of electric power.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
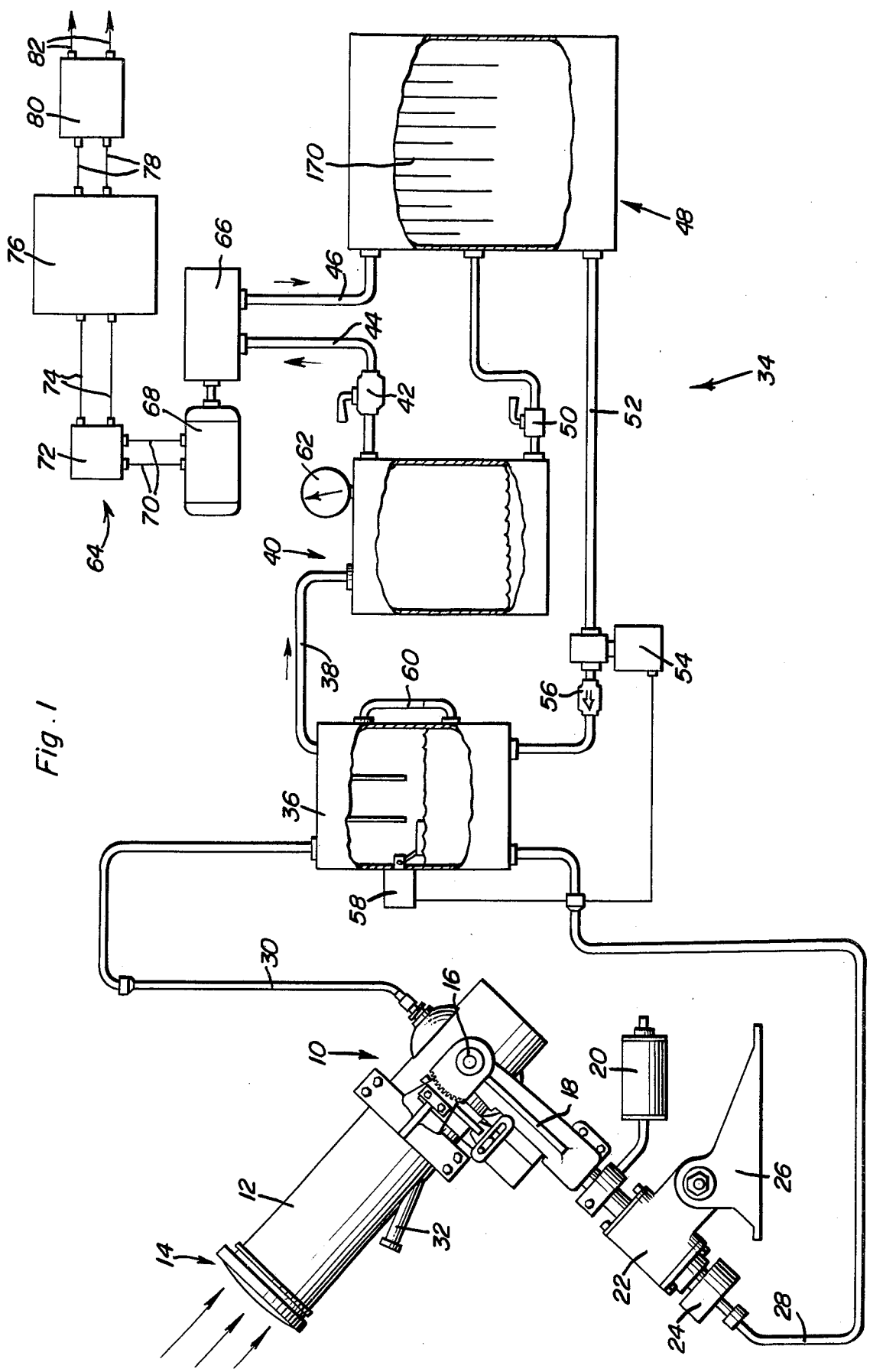
FIG. 1 is a schematic view of the sun tracking solar energy boiler of the present invention.

In the schematic drawing of the sun tracking solar energy boiler of the present invention in FIG. 1, the collector and tracking assembly is designated generally by the numeral 10 and comprises a collector consisting of cylinder 12, preferably made from aluminum, lens assembly 14, declination clock drive assembly 16, trunnion assembly 18, counterbalance 20, diurnal drive assembly 22, diurnal clock drive 24, adjustable base 26, feed water inlet line 28, steam outlet line 30, and visual alignment tube 32. Arrows in the upper left portion of FIG. 1 show the direction of incidence of solar radiation falling on lens assembly 14.

The boiler assembly, designated generally by the numeral 34 in FIG. 1, comprises preheat tank 36, connecting steam line 38, steam pressure tank 40, valve 42, engine inlet line 44, engine outlet line 46, water reservoir tank 48, drain valve 50, water return line 52, level control pump 54, check valve 56, level control switch 58, sight gauge 60, and pressure meter 62.

The generating assembly is designated generally by the numeral 64, and includes steam engine 66, which can alternatively be a steam turbine. Steam engine 66 is connected mechanically to electrical generator 68, feeding direct current by lines 70 to voltage regulator 72, which transmits power by lines 74 to storage battery 76, from which is conveyed through lines 78 direct current to inverter 80, which provides at lines 82 alternating current of a convenient voltage, such as 110 volts.

It is important to mount collector and tracking assembly 10 at a level relative to preheat tank 36 so that water level contained within the lower portion of collector and tracking assembly 10 can be properly maintained. Preheat tank 36 performs three functions: namely, a feed water source for collector and tracking assembly 10; a preheater for water fed into collector and tracking assembly 10 through water inlet line 28 and separation of condensed liquid accompanying vapor fed through steam outlet line 30 into preheat tank 36; and a level control for water in the collector and tracking assembly 10.

Figure 2:
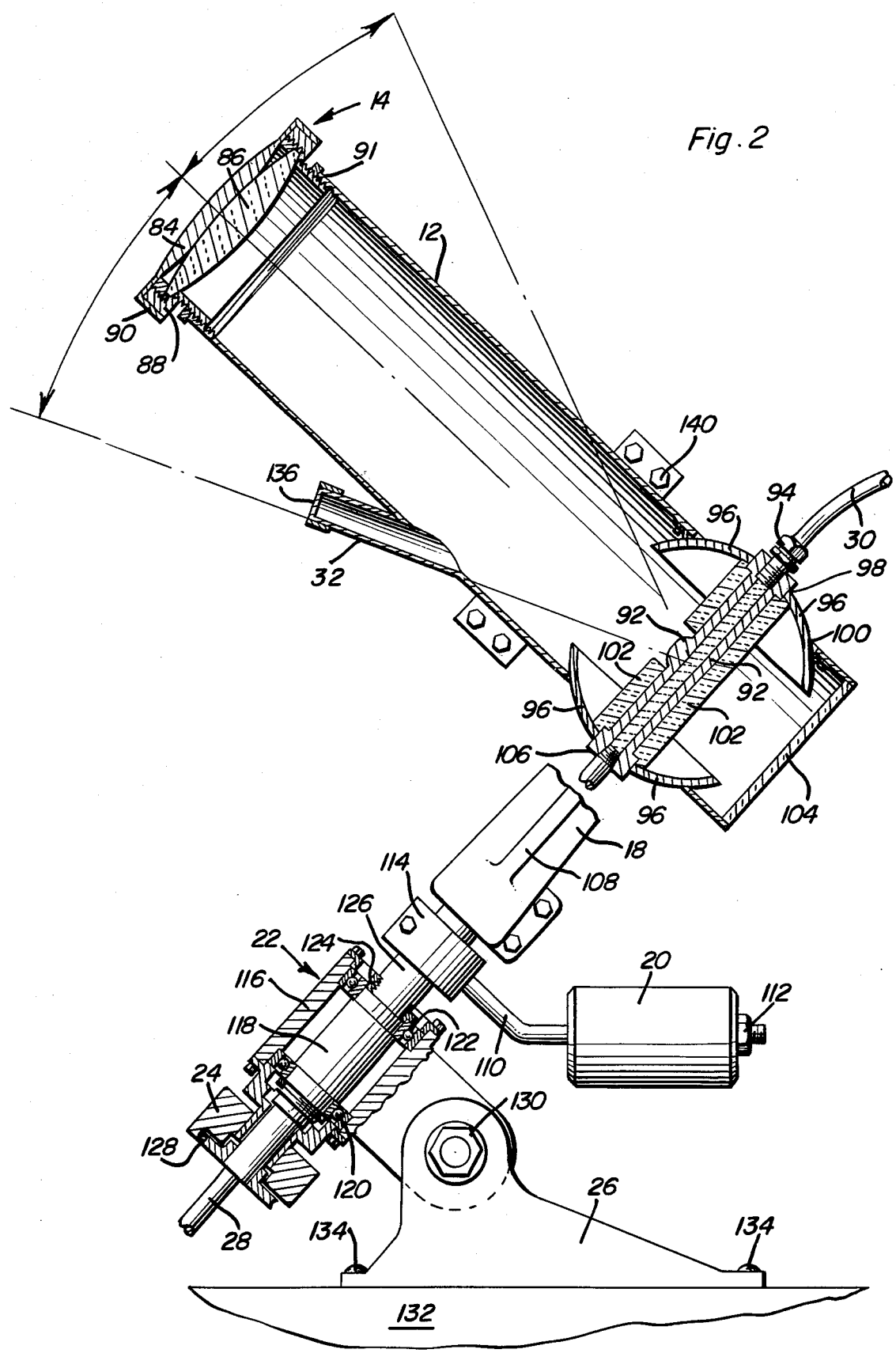
FIG. 2 is an enlarged, fragmental, side elevational view, partly in vertical longitudinal section, showing the collector and tracking assembly depicted in the left portion of FIG. 1.

Turning now to FIG. 2, showing additional details of the collector and tracking assembly 10, lens assembly 14 is made up of lens cap 84, lens 86, lens mount 88, and lens assembly housing 90. Threaded lens focuser 91, attached to lens mount 88, rotates within compatibly threaded end of cylinder 12 to adjust the distance of lens 86 along the axis of cylinder 12. Lens 86 focuses solar radiation upon rounded crown plate 92, which remains stationary, thereby providing for less complicated piping in providing feed water from below and allowing steam to rise upwardly. In geographic locations near the equator, a slightly different crown plate design is necessary in order to allow steam to rise at times when cylinder 12 is oriented near the zenith. The construction depicted in FIG. 2, however, operates satisfactorily at latitudes of 5 degrees or higher. Rounded crown plate 92 allows the collector tube of aluminum cylinder 12 to rotate through a full circle in 24 hours at a steady rate, eliminating complex mechanisms of the prior art, as well as the necessity for setting of positions manually, to relocate the collector tube from its sunset position to its sunrise position. Crown plate 92 is preferably constructed of aluminum, with the outside being anodized or coated to present an energy absorptive surface to solar radiation focused by lens 86 on the surface of crown plate 92. Diurnal adjustment of position occurs by rotation of cylinder 12 about the diurnal axis passing through the center of trunnion assembly 18 and steam outlet fitting 94 resulting in slippage of slide wings 96 at point 98 on crown plate 92. Adjustment in declination setting is made by slipping of aluminum cylinder 12 on slide wings 96 at point 100. The mechanism for operating the tracking system in tracking the sun in its diurnal movement and in its annual declination is completely automatic and will be described below. Thermal insulation 102 is provided to retain heat in the region surrounding crown plate 92. Further, retention of heat is provided by cylinder wall 104.

Trunnion assembly 18 supports the collector and associated components, and furnishes water entering the collector at inlet 106. Ridge 108 of trunnion assembly 18 provides a connection with declination clock drive 16, as will be illustrated in FIGS. 3 and 4 below. Counterbalance 20 can be adjusted along counterbalance arm 110 by adjustably rotating counterbalance nut 112 on arm 110. Counterbalance 20 is mounted through counterbalance arm 110 to the collector and tracking assembly 10 through counterbalance mount 114. the purpose of counterbalance 20 is to compensate for the moment of inertia of cylinder 12 and associated components with respect to the declination axis, as well as to compensate for the torque generated by cylinder 12 and associated components with respect to the diurnal axis, during rotation thereabout. Diurnal drive assembly 22 rotates the entire collector and tracking assembly 10 along the diurnal axis from counterbalance 20 and above, except for crown plate 92 and associated piping for carrying water or steam. The assembly rotated by diurnal drive assembly 22 is ordinarily rotated about the diurnal axis steadily through a full circle, pointing downward during nighttime hours. Diurnal clock drive 24 imparts a rotary motion at an angular velocity comparable to 360 degrees per 24 hour period to diurnal drive housing 118, supported upon stationary bearing mount 116 by bearings 120 and 122. Rotation of housing 118 is transmitted to counterbalance mount 114 through collar 124 and sleeve 126, which slips over an underlying water line (not shown) passing beneath sleeve 126, counterbalance mount 114, and trunnion assembly 18, finally terminating at inlet 106. Diurnal clock drive 24 is mounted upon bearing 128, attached to feed water inlet 28 through a drive wheel attached to housing 118. Adjustable base 26 permits manual adjustment through bolt 130 for alignment during installation. Base 26 is mounted upon a firm surface 132 through bolts 134. Visual alignment tube 32, upon removal of alignment tube cap 136, permits visual inspection of the rounded surface of crown plate 92 when solar radiation is focused by lens 86 thereon.

Figure 3:
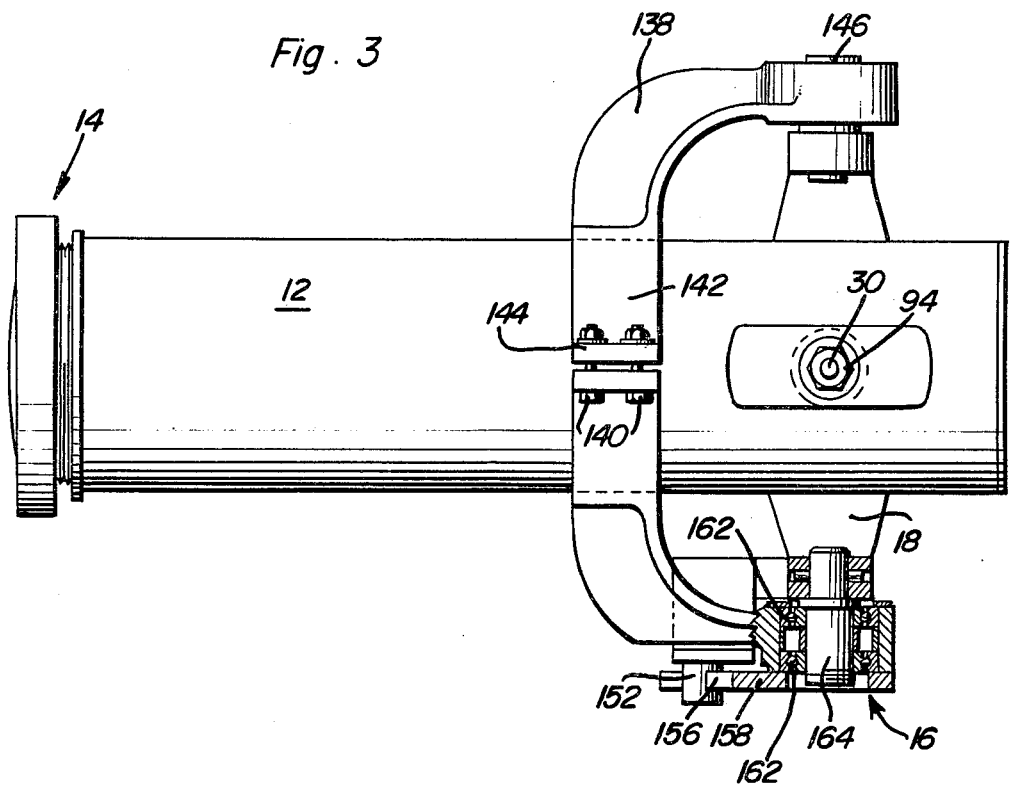
FIG. 3 is a top plan view, partly in longitudinal section, taken perpendicular to the axis of the collector assembly of FIG. 2.
Figure 4:
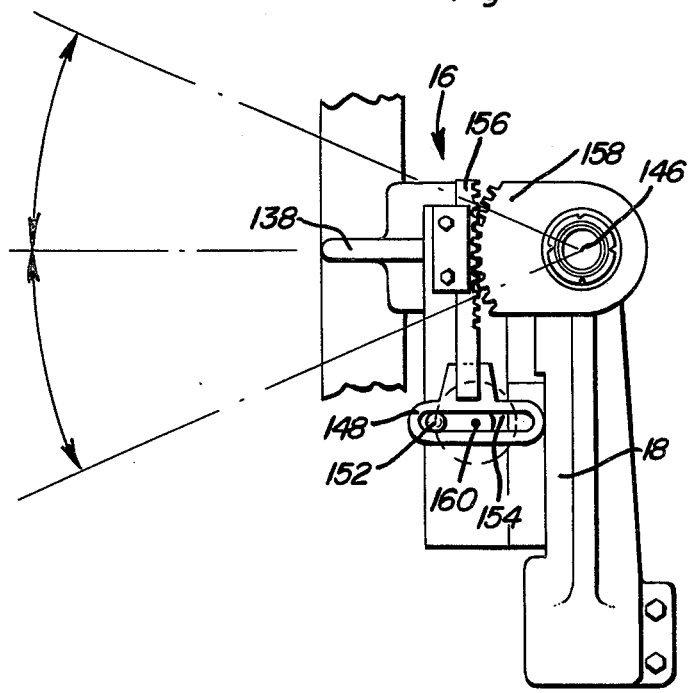
FIG. 4 is an enlarged, fragmental, side elevational view showing details of the declination clock drive assembly of the collector and tracking assembly of FIG. 2.

Details of the mechanism of declination clock drive assembly 16 are illustrated in FIGS. 3 and 4. Cylinder 12 is secured through tube yoke 138 by bolts 140, encircling collar 142, and flange 144, through which bolts 140 pass. Adjustment of the declination angle is accomplished by rotation of cylinder 12 about declination axis 146 about which tube yoke 138 pivots. Scotch yoke 148 oscillates in response to rotation of pin 152 in a direction perpendicular to the length of slit 154, thereby imparting transverse motion to rack 156, rotating pinion 158 about declination axis 146. Pin 152 is moved about the circumference of a circle centered at point 160 by a clockwork mechanism (not shown) rotating pin 152 at an angular velocity of 360 degrees per one year period of time. As pinion 158 rotates about axis 146, yoke 138 elevates or depresses cylinder 12 by rotation of bearings 162 on axle 164.

Diurnal tracking is accomplished by the diurnal clock drive which rotates the entire assembly one revolution every 24 hours about the north-south axis. This axis must be aligned, during installation, with the north-south axis of the earth. It is to be understood that installation in the southern hemisphere requires reversal of the north-south axis to south-north, and the diurnal clock drive must be run in reverse. The annual declination tracking, accomplished by declination clock drive assembly 16 mounted on trunnion assembly 18, translates rotary motion of mechanism described above. This oscillating motion moves the collector tube back and forth by tube yoke 138 to match seasonal changes of the sun's elevation from summer's maximum height to winter's maximum dip. Other tracking systems can be incorporated as an alternative to the system described above.

Figure 5:
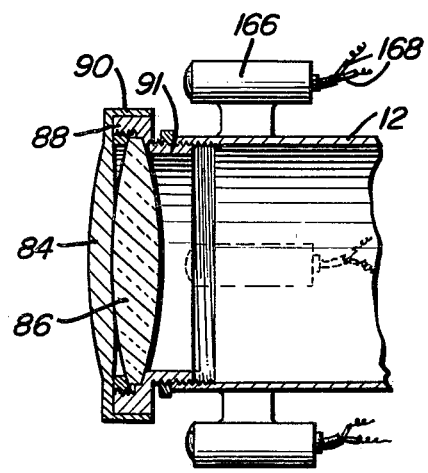
FIG. 5 is an enlarged, fragmental, partly sectional view of a second embodiment of the lens portion of the collector assembly of the present invention.

FIG. 5 illustrates a motor driven tracking system utilizing feedback provided by four light sensors mounted in a sight tube, one of which is designated by the numeral 166 in FIG. 5, parallel to cylinder 12. Two of the four light sensors 166 control the east-west motor drive and two sensors control the north-south motor drive, and sensors 166 can be of photoelectric type or can be mercury switches, preferably the former. Output from light sensors 166 is received through wires 168 by a detection system (not shown) which adjusts both declination and diurnal motor drives for maximum light intensity at sensors 166.

In order to prevent dew or frost collection on the surface of lens 86 during outdoor temperature drops, a thin heating wire network is attached to the outer surface of lens 86. When the temperature drops below a preset level, a battery current through the heating wire keeps the lens surface above the dew or frost point. In addition, a small jet of steam can be applied at an oblique angle to the outer surface of lens 86 to clean away accumulated air pollutants, such as dust or other deposits which obscure light passage and make the collecting system less efficient. Any remaining moisture is readily dried by introduction of current through the heating wire. A cycle of cleaning frequency can be determined by the experience of the sytem user, and can be set to cycle automatically.

Operation of the boiler system is as follows. Water from preheat tank 36 passes through water inlet line 28 and rises to the level of water in preheat tank 36, such level being preset by the relative location of preheat tank 36 and collector and tracking assembly 10 to fall near the rounded surface of crown plate 92. As solar energy passes through lens 86 and strikes crown plate 92, steam is generated and builds pressure in the system, filling the volume of the upper portion of preheat tank 36 with super atmospheric pressure steam. When sufficient pressure is obtained, control valve 42 permits steam to enter through line 44 into steam engine 66. Drain valve 50 allows any condensate accumulated in steam pressure tank 40 to be forced back to water reservoir tank 48. When steam engine 66 is powered by steam pressure, it in turn powers electrical generator 68, which can be of alternating current or direct current type. If generator 68 is an alternating current type, a rectifier (not shown) must be added to convert alternating current to direct current. In either case, a voltage regulator 72 is used to maintain a fixed direct current voltage range of output to storage battery 76, compensating for any variation in the rate of revolution of the rotor of electrical generator 68. Storage battery 76 chemically stores electrical energy during sunlight hours and discharges electrical energy to provide current for usage during non-sunlight hours. Steam engine 66 and generator 68 have sufficient capacity to provide electricity for storage and for direct use. Since the peak demand for electrical power ordinarily occurs during daylight hours, and since the apparatus of the present invention provides current primarily during hours of daylight, the present invention is adapted to help meet the excess demand for electrical power during peak periods of use during daylight hours.

Inverter 80 converts direct current from storage battery 76 to alternating current, preferably to conventionally used 110 volt 60 hertz alternating current (voltage being root mean square average), to permit normal household lighting and appliances to be powered thereby. To furnish 220 volt alternating currents single phase power, a more powerful generating system is required than that for furnishing 110 volt alternating current, and a 220 volt alternating current center tap inverter is required.

Water reservoir tank 48 collects spent steam through line 46 from steam engine 66 and permits condensation back to water, facilitating such condensation by condensation plates 170. Water reservoir tank 48 also provides water storage for recirculation through water return line 52 as needed in preheat tank 36, such need being determined through level control switch 58 actuating level control pump 54 and forcing water from return line 52 through check valve 56 into the lower portion of preheat tank 36.

Boiler system 34 and collector and tracking assembly 10 comprise a totally enclosed system with no loss of water. Consequently, a liquid other than water can be used as the heat transfer medium between the elements of the system. Such an alternative liquid should have a relatively low boiling point, and should be non-freezing at temperatures encountered at the location where the invention is to be operated. Ethanol is one suitable alternative liquid.

Lens 86 can be either convex, as illustrated in FIG. 2, or lens 86 can instead be a lens of the Fresnel type. Such a Fresnel lens has a surface consisting of concentric circular ridges, each ridge comprising a simple lens section focusing radiation on crown plate 92. Use of a Fresnel lens permits use of only a thin lens with a relatively short focal length and large diameter, thus permitting collection of incident radiation over a larger surface area and reducing the weight of the lens.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:
1. A sun tracking solar energy boiler comprising, in combination, a solar radiation collector and tracking assembly, a boiler assembly, and an electric power generating assembly, said collector and tracking assembly comprising a lens, a hollow crown plate located approximately at the focal point of the lens, said lens being movable by a diurnal drive means and a declination drive means for moving said lens in tracking relationship with the sun, said boiler assembly comprising a preheat tank having an upper vapor-containing portion and a lower water-containing portion, a steam pressure tank connected to the upper portion of the preheat tank, a steam engine connected to the steam pressure tank with a control valve interposed therebetween, a water reservoir tank connected with said steam engine, and level control means for maintaining water in the lower portion of said preheat tank through a pump connected with said water reservoir tank, said electric power generating means being powered by said steam engine, said preheat tank having a water inlet line connecting the lower portion thereof with and furnishing water to said crown plate, said crown plate being adapted to vaporize said water into vapor passing into a steam outlet line connected with the upper portion of said preheat tank, the water level in the lower portion of said preheat tank being adjustable by said level control means to enable said water in said water inlet line to rise to a level near the rounded surface of said crown plate to permit vaporization of said water in said crown plate.

2. The boiler of claim 1 where said lens is supportable upon a metal cylinder adapted to focusably orient said lens with respect to said crown plate, said cylinder having visual alignment means for visual checking of said crown plate, said cylinder being supportable by a collar supported by a tube yoke pivotable by said declination drive means about a declination axis, said tube yoke being supportable by a trunnion assembly rotatable about a diurnal axis by said diurnal drive means, said declination axis being perpendicular to said diurnal axis and perpendicular to the axis of said cylinder.

3. The boiler of claim 2 wherein said pivotable tube yoke is pivotable by said declination drive means by rotation of a pin through a scotch yoke connected to a rack in geared engagement with a pinion fixed to said tube yoke.

4. The boiler of claim 3 wherein said generating means comprises a direct current electrical generator powered by said steam engine, a voltage regulator connected to the electrical output of said generator, a storage battery connected to the output of said regulator and an electrical inverter, connected to the output of said storage battery and delivering alternating current output.

5. The boiler of claim 4 wherein said steam engine includes a steam turbine.

6. The boiler of claim 5 wherein said alternating current output is approximately 110 root mean square volts at a frequency of approximately 60 hertz.

7. The boiler of claim 6 wherein said lens is a Fresnel lens.

8. The boiler of claim 7 wherein said lens is convex glass.

9. The boiler of claim 8 wherein said lens has cast within said glass a heating wire network.

10. The boiler of claim 8 wherein said lens has attached to the outer surface thereof a heating wire network.

* * * * *